United States Patent
Magidson et al.

[19]

[11] Patent Number: 6,047,698
[45] Date of Patent: Apr. 11, 2000

[54] UNIDIRECTIONAL FLUID VALVE

[75] Inventors: Mark Magidson, Los Angeles; Michael Forbes Scholey, Pacoima, both of Calif.

[73] Assignee: Moldex-Metric, Inc., Culver City, Calif.

[21] Appl. No.: 09/140,070

[22] Filed: Aug. 20, 1998

[51] Int. Cl.[7] .............................. A62B 18/10; A62B 9/02; F16K 15/16

[52] U.S. Cl. .............................. 128/207.12; 128/205.24; 137/855

[58] Field of Search .......................... 128/206.21, 206.28, 128/207.12, 203.29, 205.25, 205.24, 206.15; 137/855

[56] References Cited

U.S. PATENT DOCUMENTS

| | | | |
|---|---|---|---|
| 3,990,439 | 11/1976 | Klinger | 128/207.12 |
| 4,838,262 | 6/1989 | Katz | 128/207.12 |
| 5,235,972 | 8/1993 | Strong | 128/206.21 |
| 5,325,892 | 7/1994 | Japuntich et al. | 137/855 |
| 5,687,767 | 11/1997 | Bowers | 137/855 |
| 5,735,265 | 4/1998 | Flynn | 128/203.11 |

*Primary Examiner*—John G. Weiss
*Assistant Examiner*—Todd M. Martin
*Attorney, Agent, or Firm*—Charles H. Schwartz

[57] ABSTRACT

A unidirectional fluid valve for use with a respirator includes a flexible flap initially formed as a flat resilient member. A valve body has a flat valve seat to support the flexible flap. The flexible flap is contoured to make contact with the valve seat when a fluid is not passing through the valve body, and free to lift from the valve seat when a fluid passes through the valve body. The valve body additionally includes an arm located off center relative to the flap and the arm extends inwardly in the valve body to contact the flexible flap off center to push the flexible flap at a position to deform the flexible flap to contour a concave configuration for the flexible flap and provide a secured end and a free end for the flap. In this way the flexible flap is normally pushed into sealing engagement with the flat valve seat when fluid is not passing through the valve body and is free to move away from the valve seat when fluid passes through the valve body.

13 Claims, 2 Drawing Sheets

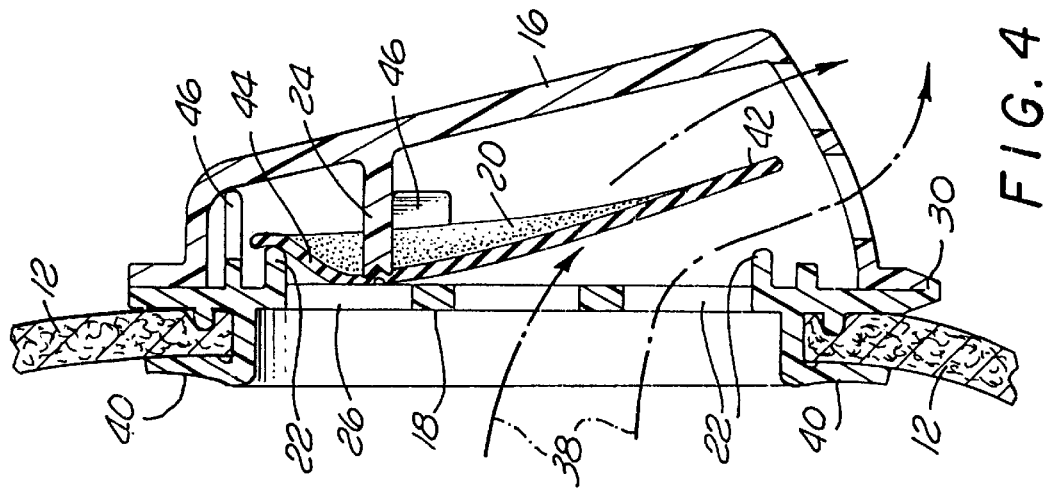
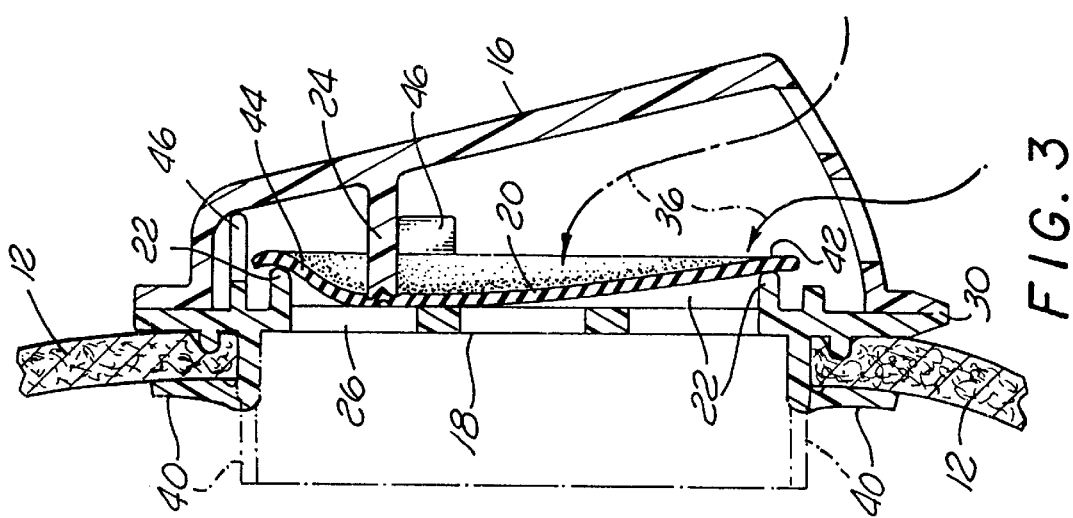

UNIDIRECTIONAL FLUID VALVE

BACKGROUND OF THE INVENTION

The present invention relates to a unidirectional fluid valve that can be used as an exhalation valve for a respirator. In addition the invention includes a respirator that employs such an exhalation valve.

Exhalation valves have been used as part of respirators for many years and have been disclosed in a variety of prior art patents. Two particular prior art patents which disclose a particular type of valve, known as a flap valve, are U.S. Pat. No. 4,934,362 and U.S. Pat. No. 5,325,892. Both of these patents disclose unidirectional exhalation valves that have a flexible flap secured to a valve seat and with the valve seat having a particular profile.

In particular the U.S. Pat. No. 4,934,362 patent has a parabolic profile for the valve seat and the U.S. Pat. No. 5,325,892 patent has a concave curvature for the valve seat corresponding to a deformation curve exhibited by a particular force directed to the flexible flap. Both of the above prior art patents thereby provide for a complex shape for the valve seat. These patents describe a structure to provide for a significantly lower pressure drop so that the free end of the flexible flap may be easily displaced from the valve seat to make the respirator mask more comfortable to wear.

SUMMARY OF THE INVENTION

In the present invention a unidirectional fluid valve is disclosed that comprises a flat flexible flap which is attached at one end to a valve seat. In the present invention the valve seat is flat and has no complex configurations. The flat flexible flap itself is deformed to have a concave curvature so as to provide the proper resilience to lay against the valve seat. The flap may then be easily displaced from the valve seat to provide for the exhaled air to be exhaled to the atmosphere.

Respirators have to be comfortable to wear and provide safety in filtering contaminants. Specifically no contaminants can enter the interior of the respirator through the exhalation valve but yet to be comfortable the respirator should displace as large a percentage of exhaled air as possible through the exhalation valve with minimum effort. The present invention provides for a exhalation valve having a flexible flap that makes a substantially uniform seal to a flat valve seat under any orientation of the exhalation valve because the flap is deformed to have a concave shape to provide a holding force against the valve seat. The present invention also minimizes discomfort to the wearer by reducing exhalation pressure within the respirator and yet purges a high percentage of the exhaled air through the exhalation valve.

BRIEF DESCRIPTION OF THE DRAWINGS

FIG. 3 is a cross-sectional view of the exhalation valve of the present invention taken along line 3—3 of FIG. 1 with the flap in a closed position, and FIG. 4 is a cross-sectional view of the exhalation valve of the present invention taken along line 3—3 of FIG. 1 with the flap in an open position.

DETAILED DESCRIPTION OF THE INVENTION

Figure 1:
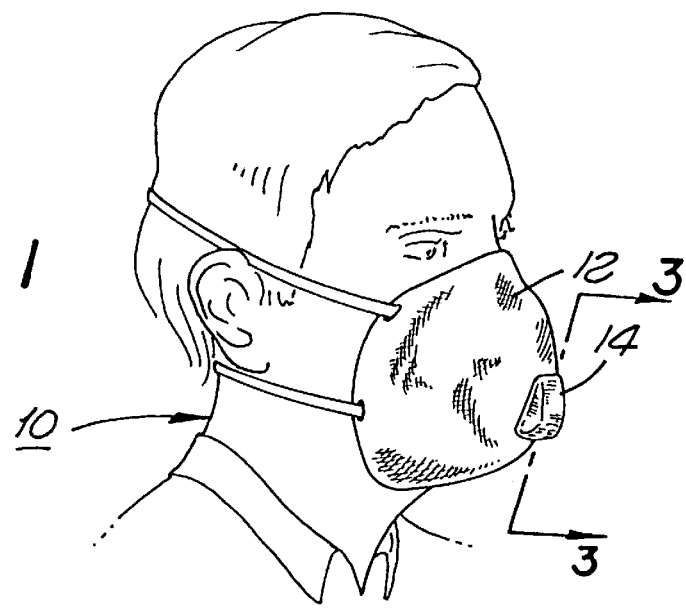
FIG. 1 illustrates a respirator positioned on the face of the user and with the respirator including a exhalation valve.

As can be seen in FIG. 1 a user 10 is wearing respirator mask 12 formed of filter material including a valve 14. The valve 14 is an exhalation valve that allows for the user to expel exhaled air to the atmosphere. It is desirable that the exhalation valve 14 safely prevent any contaminates from entering the interior of the mask while at the same time allowing for a high percentage of the exhaled air to be purged through the exhalation valve. As can be seen in FIG. 1 the exhalation valve 14 is positioned on the respirator substantially opposite to the wearer's mouth as the face mask 12 is being worn. This helps to have the air easily exhausted because of the position of the valve 14.

Figure 2:
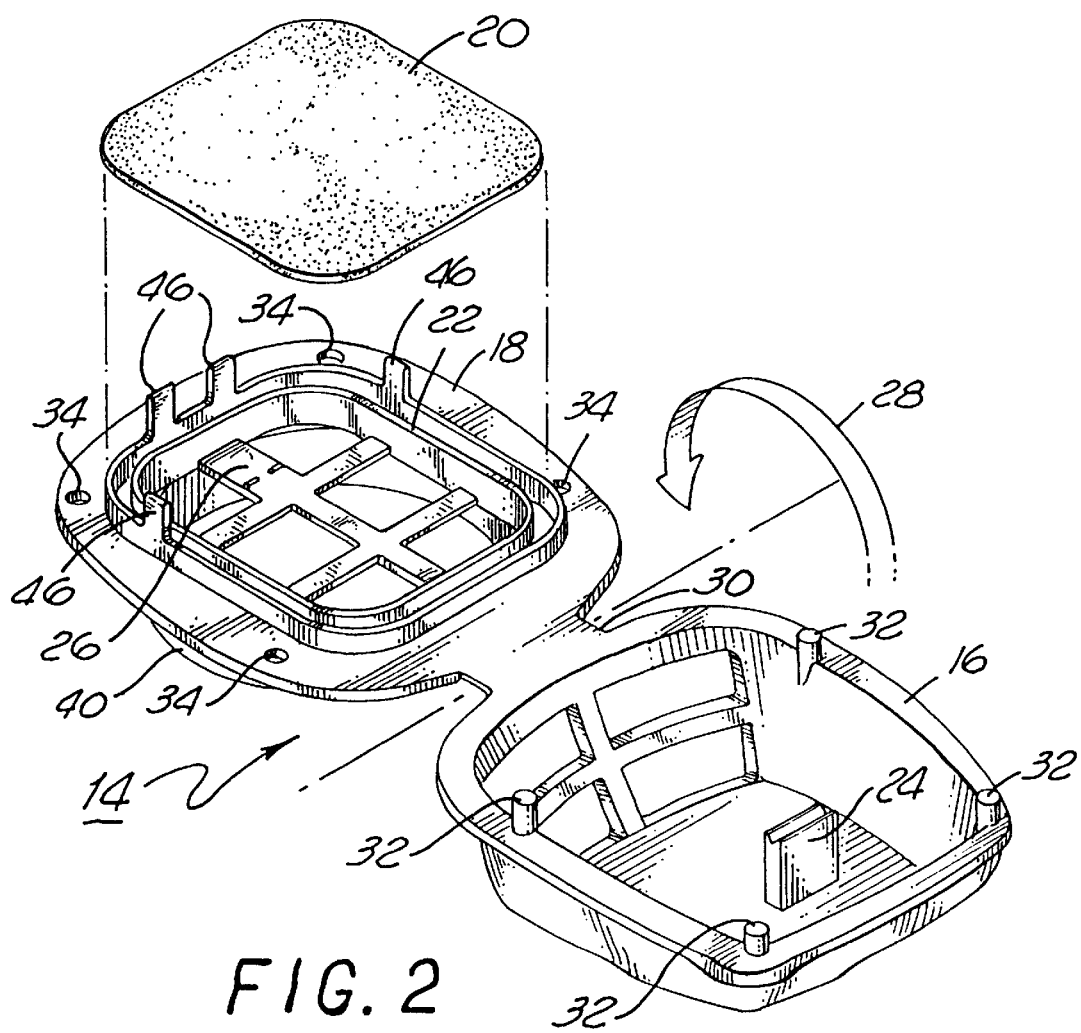
FIG. 2 is a exploded perspective view showing the component portions of the exhalation valve of the present invention.

In FIG. 2 it can be seen that the exhalation valve 14 is formed of two half members 16 and 18 sandwiching a flat flexible flap 20. The flap member 20 when positioned within the valve section 18 would lie on top of a valve seat 22. As shown the valve seat 22 is all in the same flat plane and has no complex curvature. The valve member 16 includes an off center arm 24 which cooperates with a shelf portion 26, located within the valve seat 22, to lock the flexible flap 20 off center in position within the valve 14 when the two half members 16 and 18 are closed, as shown by arrow 28, around a hinge portion 30.

In particular the flap 20 is seated on top of the valve seat 22 when the valve member 16 is closed onto the valve member 18 around the hinge portion 30 and with the pins 32 frictionally received in complementary openings 34 to lock the two valve portions 16 and 18 together. The flap 20 is also positioned on the seat 22 by the upstanding guide member 46, at the back and side of the seat 22. When the two valve members are locked together, the arm 24 extends down inside of the seat 22 to capture the flap 20 against the portion 26 and deform the flap 20 to provide for a contouring of the flexible flap 20 off center to a concave shape as can be seen in FIGS. 3 and 4. Specifically flap 20 is shown in FIGS. 3 and 4 to be contoured to have a gentle curve inward completely around the circumference of the flat valve seat 22.

The off center contouring of the flexible flap 20 therefore provides for a sufficient holding force for the flap 20 to lie against and seal to the valve seat 22 and to have a free end 42 and a se cured e nd 44. The guide members 46 are located at the secured end 44 on the back and sides but not near the free end 42. This prevents any binding of the free end 42 during exhalation.

As air is being breathed into the mask, any air that impinges against the flap 20, as shown by arrows 36, would tend to further seal the concave flap member 20 against the seat 22. Conversely when air is exhaled, as shown by arrows 38, then the free end 42 of the flap 20 is gently lifted off of the valve seat 22 in the area shown by the arrows 38 representing the exhaled air.

The flap valve 14 shown in the present invention has the advantage of being very simple in construction, in using a flat valve seat in a single plane, and yet provides for a flexible flap which can open easily and widely to allow for the exhaled air to exit the interior of the mask with little resistance.

Typically the valve 14 could be attached to the mask using a variety of techniques. The present invention provides for the mask being very simply attached by a flange member 40 which extends outwardly in a circumferencial ring as shown by the flange 40 in dotted line in FIG. 3. The flange 40 may be bent over with heat and pressure to seal to an opening in the mask 12. This is shown by the flange 40 in full line in both FIGS. 3 and 4. This type of seal of the valve to the opening in the mask is very effective for mask material which has more bulk and substance than some of the prior air masks.

Although the invention has been described with reference to a particular embodiment it is to be appreciated that adaptations and modifications may be made and the invention is only to be limited by the appended claims.

What is claimed is:

1. A unidirectional fluid valve, including a flexible flap initially formed as a flat resilient member, a valve body for receiving and supporting the flexible flap, the valve body having a seat portion completely formed in a flat plane to support the flexible flap and with the flexible flap contoured to make contact with and seal to the seat when fluid is not passing through the valve body and being free to lift from the seat when fluid passes through the valve body, and the valve body additionally including an arm located off center relative to the flap and extending inwardly in the valve body to contact the flexible flap off center to push the flexible flap at a position to deform the flexible flap to contour a concave configuration for the flexible flap to form a secured end and a free end for the flap so that both the secured end and free end of the flexible flap normally are pushed into sealing engagement with the seat completely formed in the flat plane when fluid is not passing through the valve body and the free end can move away from the seat completely formed in the flat plane when fluid passes through the valve body.

2. The unidirectional fluid valve of claim 1 wherein the valve body is formed of two half members which sandwich the flexible flap.

3. The unidirectional fluid valve of claim 2 wherein one half member includes the arm and the other half member includes a complementary shelf portion and with the flexible flap captured between the arm and shelf portion to deform the flexible flap to contour the concave configuration.

4. The unidirectional fluid valve of claim 2 wherein the two half members are hinged together and are rotated around the hinge to form the valve body.

5. The unidirectional fluid valve of claim 2 wherein one half member includes a plurality of pins and the other half member includes complementary openings and the pins and openings frictionally lock together to form the half members into the valve body.

6. The unidirectional fluid valve of claim 1 additionally including upstanding guide members located at the secured end of the flap to locate the flap on the seat completely formed in the flat plane without binding the free end of the flexible flap.

7. A respirator having a unidirectional exhalation valve, including a respirator mask formed of filter material and having an opening for receiving an exhalation valve, the exhalation valve, including a flexible flap initially formed as a flat resilient member, a valve body for receiving and supporting the flexible flap, the valve body having a seat portion completely formed in a flat plane to support the flexible flap and with the flexible flap contoured to make contact with and seal the seat when fluid is not passing through the valve body and being free to lift from the seat when fluid passes through the valve body, and the valve body additionally including an arm located off center relative to the flap and extending inwardly in the valve body to contact the flexible flap off center to push the flexible flap at a position to deform the flexible flap to contour a concave configuration for the flexible flap to form a secured end and a free end for the flap so that both the secured end and the free end of the flexible flap normally are pushed into sealing engagement with seat completely formed in the flat plane when fluid is not passing through the valve body and the free end can move away from the seat completely formed in the flat plane when fluid passes through the valve body.

8. The respirator of claim 7 wherein the valve body is formed of two half members which sandwich the flexible flap.

9. The respirator of claim 8 wherein one half member includes the arm and the other half member includes a complementary shelf portion and with the flexible flap captured between the arm and shelf portion to deform the flexible flap to contour the concave configuration.

10. The respirator of claim 8 wherein the two half members are hinged together and are rotated around the hinge to form the valve body.

11. The respirator of claim 8 wherein one half member includes a plurality of pins and the other half member includes complementary openings and the pins and openings frictionally look together to form the half members into the valve body.

12. The respirator of claim 7 wherein the valve body includes a circumferential flange which is received in the opening in the filter material and with the flange deformed around the circumference to capture the filter material between the valve body and deformed flange.

13. The respirator of claim 7 additionally including upstanding guide members located at the secured end of the flap to locate the flap on the seat completely formed in the flat plane without binding the free end of the flexible flap.

* * * * *